Feb. 24, 1948.    S. J. ROBINS    2,436,605
LAPPING DEVICE
Filed June 22, 1944
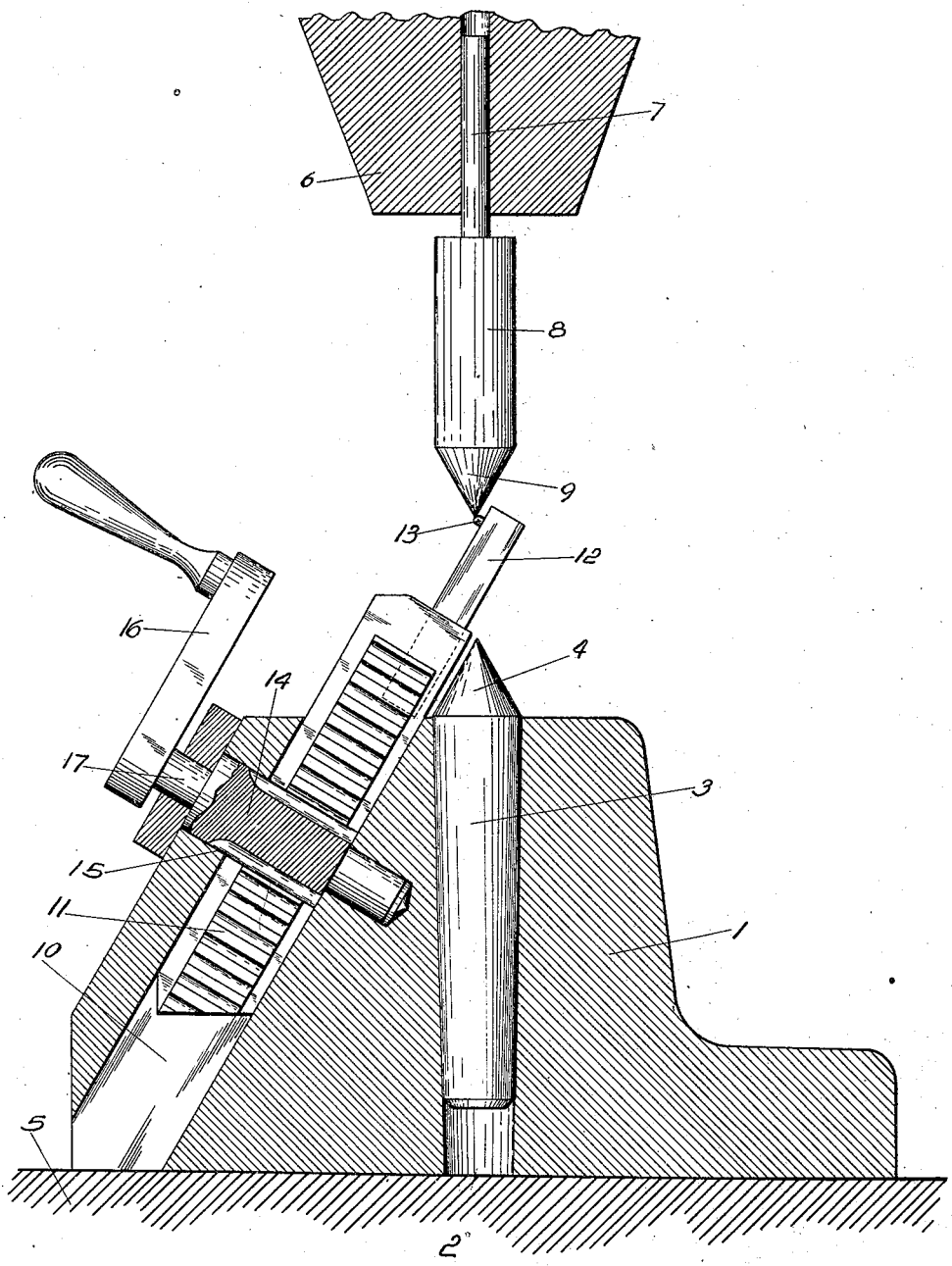
INVENTOR.
Stanley John Robins
BY
Michaels & Michaels,
ATTORNEYS Patented Feb. 24, 1948

2,436,605

UNITED STATES PATENT OFFICE 2,436,605

LAPPING DEVICE

Stanley J. Robins, New York, N. Y.

Application June 22, 1944, Serial No. 541,599

1 Claim. (Cl. 51—71)

This invention relates to means for lapping female work centers and for dressing the lapping tool between lapping operations. It has particular reference to a combination lapping and dressing device which can be operated as a simple attachment of a rotary machine tool such as for instance a drill press, and in such combination renders special lapping and dressing machines superfluous.

In the drawing affixed to this specification and forming part thereof an embodiment of this invention is illustrated diagrammatically by way of example in side elevation, partly in vertical section.

Referring to the drawing, 1 is a metal base or block formed with a conical bore 2, in which is vertically mounted the dead center work rest, being a steel pin 3 with a conical centering point 4. This block is shown as resting on the table 5 of a drill press with the dead centre pin 3 coaxially aligned with the drill spindle socket conventionally indicated at 6. 7 is the stem carrying the cylindrical lapping stone 8 with its conical lapping face 9 which may for instance extend at an angle of 60° to the vertical. The spindle or the table or both may be arranged for vertical movement, as usual in these machine tools.

In a groove or bore 10 of the block 1 which extends at the same angle to the vertical as the conical face 9 of the lapping stone, a rack 11 is arranged for reciprocation. It supports the dressing tool consisting of a steel bolt 12 with a cutting diamond 13 or other dressing means mounted in it near the point at which the axis of rotation of the lapping stone intersects the bolt. Reciprocatory movement can be imparted to the rack and dressing tool by a pinion 14 mounted in a bore 15 extending at right angles to the rack and meshing with it. A crank 16 on the pinion axle 17 serves for raising the rack and moving the cutting edge of the dressing tool 13 in parallel to and across the lapping face of the stone 8.

In the operation of the device above described the stone 8 is fixed in the drill socket, the block 1 is placed on the table of the drill press or other machine tool with the pin 3 axially aligned with the stone whereupon a workpiece can be mounted on the center pin and a female center formed by lapping with the aid of the stone in the top face of the workpiece. When it is desired to true the stone surface by dressing, the workpiece is removed. The block is then raised with the table 5, or the stone is lowered, until the parts assume the position shown in the drawing, whereupon the diamond is gradually moved across the lapping face of the stone by turning the crank until this face has been dressed. The rack and dressing tool are then lowered by turning the crank and the stone and pin 3 are shifted axially for the insertion of the work between them.

The combination, shown in the drawing, of the dressing device with the dead centre pin has been found to form a particularly effective solution of the problem to create a lapping and dressing device forming a simple attachment adapted to be temporarily mounted and operated on a machine tool such as for instance a drill press.

This combination also improves the dressing operation which starts at the point of the lapping stone, because the tool carrier 11, 12 is shortest and therefore vibrates less at the start, while in the known arrangement the tool carrier, being mounted above the point of the stone, must be fully extended in order to contact the point and therefore is subject to wider vibrations.

I claim:

In a device for alternately lapping and dressing workpieces, in combination a portable support and a vertical center pin mounted in said support, a dressing tool and means for reciprocating said dressing tool in a plane extending at an angle other than a right angle to the vertical, said tool and reciprocating means being also mounted in said support, whereby, when said support is situated underneath a conical lapping tool rotatable about a vertical axis, the workpiece may be centered between the lapping tool cone and said center pin and be lapped, whereupon after removal of the workpiece, said lapping cone and dressing tool may be contacted by suitable adjustment, and the lapping tool dressed between two lapping operations.

STANLEY J. ROBINS.

REFERENCES CITED

The following references are of record in the file of this patent:

UNITED STATES PATENTS

| Number | Name | Date |
|---|---|---|
| Re. 17,313 | Davis | June 4, 1929 |
| 1,261,157 | Norton | Apr. 2, 1918 |
| 1,294,541 | Rundqvist | Feb. 18, 1919 |
| 1,357,814 | Olson | Nov. 2, 1920 |
| 1,479,116 | Tozer | Jan. 1, 1924 |
| 1,484,310 | Spencer | Feb. 19, 1924 |
| 1,527,295 | Cumner et al. | Feb. 24, 1925 |
| 1,892,388 | Edgar | Dec. 27, 1932 |
| 1,972,826 | Haas | Sept. 4, 1934 |

FOREIGN PATENTS

| Number | Country | Date |
|---|---|---|
| 339,678 | Germany | Aug. 2, 1921 |